United States Patent Office 3,089,912
Patented May 14, 1963

3,089,912
PROCESS FOR THE PRODUCTION OF 6-[2',6'-TRI-METHYLCYCLOHEXEN-(1')-YL]-4-METHYL-HEXADI-3,5-EN-1-YN
Karl Eiter, Cologne-Stammheim, Ernst Truscheit, Leverkusen, and Hermann Oediger, Cologne-Flittard, Germany, assignors to Farbenfabriken Bayer Aktiengesellschaft, Leverkusen, Germany, a corporation of Germany
No Drawing. Filed Mar. 27, 1961, Ser. No. 98,290
Claims priority, application Germany Apr. 2, 1960
2 Claims. (Cl. 260—666)

It is known that 6-[2',6',6'-trimethylcyclohexen-1'-yl]-4-hydroxy-4-methylhex-5-en-1-yn (I) can be obtained by reacting β-ionone with propargyl bromide and either zinc or magnesium under the conditions of the Reformatsky reaction (see Swiss Patent Specification No. 258,514; United States Patent No. 2,676,990 and United States Patent application Serial No. 75,105, filed December 12, 1960) and that by splitting off water from the resulting product, for example with an inorganic acid halide in the presence of a tertiary base, 6-[2',6',6'-trimethylcyclohexen-1'-yl]-4-methylhexadi-3,5-en-1-yn (II) is obtained as the main reaction product, together with a small amount of 6-[2',6',6'-trimethylcyclohexen-2'-ylidene]-4-methylhex-4-en-1-yn (III) (see United States Patent application Serial No. 75,105, filed December 12, 1960).

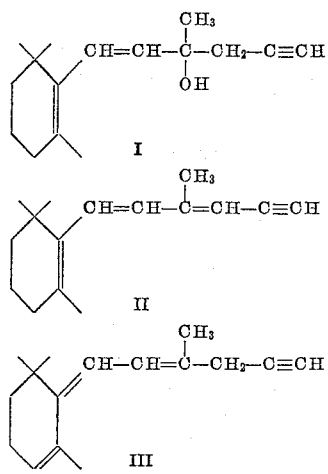

It is also known that when β-ionylidene acetaldehyde is reacted with ethyl γ-bromo-β-methyl crotonate and zinc in benzene [H. O. Huisman and collaborators, Rec. Trav. Chim. Pays-bas 71 (1952), page 899, particularly pages 908–910 and 918–919] an unsaturated compound is obtained instead of the expected hydroxy compound. The unsaturated compound which is obtained by this reaction contains one molecule of water less than the expected hydroxy compound. This unexpected reaction takes place under forced conditions, for example at a temperature of approximately 100° C. and gives rise mainly to compounds which belong to the so-called "Retro-series." Considerable quantities of resinous by-products are also obtained under these reaction conditions.

When β-ionone is reacted with propargyl bromide and zinc under the reaction conditions described in the preceding paragraph we have found that the expected acetylene carbinol I is obtained in good yield and that resinous products containing one molecule of water less than the acetylene carbinol I are only formed in extremely small quantities.

It is also known that the expected acetylene carbinols are obtained by reacting aldehydes or ketones with propargyl magnesium bromide [H. Gutmann and collaborators Helv. Chim. Acta 42, 719 (1959)]. Finally, it is also known that the expected acetylene carbinols are obtained by reacting an aldehyde or a ketone at a temperature above 25° C. with the organo-metallic compound obtained by reacting aluminium with propargyl bromide [P. Läuger et al., Helv. Chim. Acta 42, page 2379 (1959)].

It has now been found that 6-[2',6',6'-trimethylcyclohexen-1'-yl]-4-methylhexadi-3,5-en-1-yn (II), together with a small quantity of 6-[2',6',6'-trimethylcyclohexen-2'-ylidene]-4-methylhex-4-en-1-yn (III), are directly obtained by reacting β-ionone at a temperature below 25° C. with an organic aluminium compound which may be prepared by reacting a propargyl halide with aluminium.

It is very surprising that the expected acetylene carbinol I is not obtained in the process according to the present invention, especially at the relatively low reaction temperatures employed.

It is also surprising that the "Retro-isomer" III is not formed in an appreciable yield [see H. O. Huisman, loc. cit.]. The quantity of "Retro-isomers" III which is formed in the process according to the present invention is approximately the same as that which is formed by the splitting off of water from the acetylene carbinol (I) with an inorganic acid halide in the presence of a tertiary base.

No by-products containing allene groupings

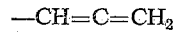

are formed in the process according to the present invention, as is clearly apparent from the infrared absorption spectrum of the reaction products. This is in contrast to other organo-metallic reactions of aldehydes and ketones with propargyl halides.

The "Retro-isomer" III which is formed as a by-product in the process according to the present invention can be easily removed from the desired reaction product by freezing it out of a solution of the reaction product in an organic solvent, since the isomer melts at 51° C.

Thus the process according to the present invention gives high yields of 6-[2',6',6'-trimethylcyclohexen-1'-yl]-4-methylhexadi-3,5-en-1-yn (II) of a high degree of purity in a single-stage reaction which can readily be carried out on a commercal scale. The product is an important intermediate for the synthesis of Vitamin A, β-carotene and carotenoids.

In carrying out the process according to the present invention, from 1.4 to 1.6 mols of a propargyl halide, for example propargyl bromide or propargyl iodide, are first of all reacted with one gram atom of aluminium in the form, for example, of chips, coarse powder or flakes. The reaction is carried out in the presence of a solvent, for example diethyl ether, tetrahydrofuran or dioxane or a mixture of these solvents and at a temperature of from −30° C. to +50° C. and preferably at a temperature of from 0° C. to +25° C. It is preferable to employ aluminium which has been, for example, activated with a small quantity of mercuric chloride.

The solution of the organic aluminium compound thus prepared is reacted with from 0.7 to 0.9 mol of β-ionone per mol of propargyl halide. The β-ionone is dissolved in one of the aforementioned solvents. The reaction is carried out at a temperature of from −20° C. to +25° C. It is preferable to add the β-ionone solution to the solution of the organic aluminium compound at a temperature of from −20° C. to −10° C. and then to raise the temperature of the reaction mixture gradually to 0° C. The reaction is finally completed by leaving the reaction mixture for some time at a temperature of from 0° C. to 25° C.

Working up is carried out in the usual manner, for example by stirring the reaction mixture into iced water, in which may be dissolved an acidly reacting electrolyte, for example ammonium chloride, sulfuric acid, hydrochloric acid, phosphoric acid or acetic acid. The organic phase, is, for example, extracted with ether. The evaporation residue of the combined extracts is dissolved in a solvent, for example n-hexane or preferable petroleum ether (B.P. 30° C. to 50° C.), the solution is cooled to a temperature of from 0° C. to −80° C. and the "Retro-isomer" III which precipitates in crystalline form is separated out. The evaporation residue of the filtrate constitutes the 6-[2',6',6'-trimethylcyclohexen-1'-yl]-4-methylhexadi-3,5-en-1-yn, which can be used directly for further reactions without separation and purification.

In order to achieve a complete conversion, it is preferable to employ highly concentrated reaction solutions. Thus, a total of from 250 to 800 parts by volume of solvent per mol of propargyl halide (including the quantity of solvent necessary to dissolve the β-ionone) are preferably employed in the process according to the present invention, amounts of solvent of from 300 to 500 parts by volume per mol of propargyl halide being particularly preferred. It is preferable to carry out all operations in the absence of atmospheric oxygen and to add a small amount of an anti-oxidant, for example hydroquinone of phenthiazine, to the β-ionone.

*Example 1*

A small quantity of mercuric chloride and 15 parts by volume of absolute tetrahydrofuran are added to 2.2 parts by weight of aluminium flakes. A mixture of 14.2 parts by weight of propargyl bromide and 14 parts by volume of absolute tetrahydrofuran is then added at a temperature of from 15° C. to 25° C. while stirring in a nitrogen atmosphere. When the addition is complete and the reaction has subsided, the reaction mixture is stirred for approximately one hour at 20° C. A mixture of 17 parts by weight of β-ionone and 15 parts by volume of absolute tetrahydrofuran is then added to the reaction mixture at a temperature of from −17° C. to −14° C. and while stirring vigorously. The addition takes place over a period of approximately 30 minutes.

The temperature of the reaction mixture is maintained at −15° C. for one hour after which the temperature of the reaction mixture is allowed to rise to 0° C. over a period of approximately one hour. The temperature is maintained at 0° C. for 30 minutes and then allowed to rise to 20° C. over a period of from 1 to 2 hours. The reaction mixture is then incorporated by stirring into iced water in a nitrogen atmosphere and the organic phase is extracted by shaking it with ether. The combined ether extracts are washed with cold saturated ammonium chloride solution and then dried over sodium sulfate. After evaporating off the solvent under reduced pressure, there are obtained approximately 18.8 parts by weight of a relatively thinly liquid substance which is deep yellow in colors. The product is dissolved in from 60 to 70 parts by volume of petroleum ether (B.P. 30° C. to 50° C.). The resulting solution is cooled to a low temperature (from −40° C. to −50° C.) and the precipitate which separates out in crystalline form after a time is quickly suction-filtered. There are thus obtained approximately 4 parts by weight of 6-[2',6',6'-trimethylcyclohexen-2'-ylidene]-4-methylhex-4-en-1-yn (III) having a melting point of 51° C. The product is obtained in the form of colorless crystals; $\lambda_{max}$: 283 m$\mu$ ($\epsilon$=47,000), inflections at 294 m$\mu$ ($\epsilon$=34,000) and 274 m$\mu$ ($\epsilon$=37,000). The infrared absorption spectrum of the product shows characteristic absorption bands at 3300 cm.$^{-1}$ (characteristic of a C≡CH-group) and at 2120 cm.$^{-1}$ (characteristic of an α,β-saturated C≡C-bond).

From the concentrated mother liquor it is possible to separate out a further 0.3 part by weight of 6-[2',6',6'-trimethylcyclohexen-2'-ylidene]-4-methylhex-4-en-1-yn by cooling the mother liquor to a low temperature and filtering with suction. The solvent is evaporated from the filtrate under reduced pressure. 14 parts by weight =74% of the theoretical) of 6-[2',6',6'-trimethylcyclohexen-1'-yl]-4-methylhexadi-3,5-en-1-yn (II) are obtained as residue, $n_D^{20}$: 1.5570. A sample of substance can be distilled without residue under high vacuum to give a yellowish distillate having a boiling point at 0.001 mm. Hg of 65° C. (air bath temperature); $n_D^{20}$: 1.5535; $\lambda_{max}$: 283 m$\mu$ ($\epsilon$=20,000). The infrared absorption spectrum of the product shows characteristic absorption bands at 3300 cm.$^{-1}$ (C≡CH-group), at 2080 cm.$^{-1}$ (α,β-unsaturated C≡C-bond) and at 965 cm.$^{-1}$ (symmetrically disubstituted

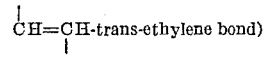

$\overset{|}{C}H=\overset{|}{C}H$-trans-ethylene bond)

*Analysis.*—C$_{16}$H$_{22}$ (molecular weight 214.36). Calculated: C, 89.65%; H, 10.35%. Found: C, 89.02%; H, 10.33%.

What is claimed is:

1. A process for the production of 6-[2',6',6'-trimethylcyclohexen-1'-yl]-4-methylhexadi-3,5-en-1-yn, which comprises reacting β-ionone at a temperature below +25° C. with an organic aluminium compound prepared from a propargyl halide and aluminium, using from 200 to 800 parts by volume of solvent per mol of propargyl halide.

2. A process for the production of 6-[2',6',6'-trimethylcyclohexen-1'-yl]-4-methylhexadi-3,5-en-1-yn, which comprises reacting β-ionone at a temperature below 25° C. with an organic aluminum compound prepared from a propargyl halide and aluminum, using from 300 to 500 parts by volume of solvent per mol of propargyl halide.

References Cited in the file of this patent

UNITED STATES PATENTS 2,676,990    Humphlett et al.    Apr. 27, 1954
2,846,475    Montavon et al.    Aug. 5, 1958

OTHER REFERENCES

Lauger et al.: Helv. Chim. Acta., vol. 42, page 2379, 1959.